US011625542B2

(12) United States Patent
Bill

(10) Patent No.: US 11,625,542 B2
(45) Date of Patent: *Apr. 11, 2023

(54) INSTANT MESSAGING APPLICATION CONFIGURATION BASED ON VIRTUAL WORLD ACTIVITIES

(71) Applicant: Verizon Patent and Licensing Inc., Basking Ridge, NJ (US)

(72) Inventor: David S. Bill, San Francisco, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/183,960

(22) Filed: Feb. 24, 2021

(65) Prior Publication Data

US 2021/0182500 A1 Jun. 17, 2021

Related U.S. Application Data

(63) Continuation of application No. 14/462,500, filed on Aug. 18, 2014, now Pat. No. 10,963,648, which is a continuation of application No. 11/937,345, filed on Nov. 8, 2007, now abandoned.

(60) Provisional application No. 60/864,898, filed on Nov. 8, 2006.

(51) Int. Cl.

| | |
|---|---|
| ***G06F 3/0481*** | (2022.01) |
| ***G06F 3/0482*** | (2013.01) |
| ***G06F 3/00*** | (2006.01) |
| ***G06F 40/40*** | (2020.01) |
| ***H04L 51/10*** | (2022.01) |
| ***G06F 40/30*** | (2020.01) |
| ***G06F 40/205*** | (2020.01) |
| ***G06F 40/157*** | (2020.01) |
| ***G06F 40/284*** | (2020.01) |
| ***G06F 40/35*** | (2020.01) |
| *H04W 4/02* | (2018.01) |
| *H04L 51/04* | (2022.01) |
| *H04L 67/54* | (2022.01) |

(52) U.S. Cl.

CPC ............ *G06F 40/40* (2020.01); *G06F 40/157* (2020.01); *G06F 40/205* (2020.01); *G06F 40/284* (2020.01); *G06F 40/30* (2020.01); *G06F 40/35* (2020.01); *H04L 51/10* (2013.01); *H04L 51/04* (2013.01); *H04L 67/54* (2022.05); *H04W 4/02* (2013.01)

(58) Field of Classification Search

None

See application file for complete search history.

(56) References Cited

U.S. PATENT DOCUMENTS

| | | | |
|---|---|---|---|
| 5,880,731 | A | 3/1999 | Liles et al. |
| 6,522,333 | B1 | 2/2003 | Hatlelid et al. |
| 6,559,863 | B1 | 5/2003 | Megiddo |
| 7,765,265 | B1 | 7/2010 | Granito et al. |

(Continued)

*Primary Examiner* — Jordany Nunez

(57) ABSTRACT

A co-user list may be configured based on user interaction in a virtual world environment. A first user may be enabled to navigate the virtual world environment using an instant messenger application that includes the co-user list. A second user that is located proximate to the first user in the virtual world environment may be detected. An attribute associated with the second user may be determined. The co-user list may be configured based on the attribute associated with the second user.

20 Claims, 8 Drawing Sheets

(56) References Cited

U.S. PATENT DOCUMENTS

| | | | |
|---|---|---|---|
| 8,171,084 | B2 | 5/2012 | Walter et al. |
| 8,386,265 | B2 * | 2/2013 | Subramanian ...... G10L 19/0018 704/277 |
| 9,135,740 | B2 | 9/2015 | Russell et al. |
| 2003/0002633 | A1 | 1/2003 | Kredo et al. |
| 2004/0056901 | A1 | 3/2004 | March et al. |
| 2004/0179039 | A1 | 9/2004 | Blattner et al. |
| 2005/0043951 | A1 * | 2/2005 | Schurter ................ H04L 51/04 704/270.1 |
| 2006/0145943 | A1 * | 7/2006 | Tarlton ............. H04M 1/72427 345/2.3 |
| 2007/0002057 | A1 | 1/2007 | Danzig et al. |
| 2007/0166690 | A1 * | 7/2007 | Johnson ................ G09B 19/00 434/236 |
| 2008/0005325 | A1 | 1/2008 | Wynn et al. |
| 2014/0289604 | A1 | 9/2014 | Cheung et al. |

* cited by examiner

500

520b
505 510 515 517
520a 520c

| Image | Text String | Text.. | Meaning |
|---|---|---|---|
| | :) :-> | (Nice) | happy |
| | :( | (sad) | sad |
| | ;) | | winking |
| | :D | | big grin |
| | ;;) | | batting eyelashes |
| | >:D< | | big hug |
| | :-/ | | confused |
| | :x | | love struck |
| | :"> | | blushing |
| | :P | | tongue |
| | :-* | | kiss |
| | =(( | | broken heart |
| | :-O | | surprise |
| | X( | (mad) | angry |
| | :> | | smug |
| | B-) | | cool |
| | :-S | | worried |
| | #:-S | | whew! |
| | >:) | (devil) | devil |
| | :(( | | crying |
| | :)) | lol | laughing |
| | :\| | | straight face |
| | /:) | | raised eyebrow |
| | =)) | rolf | rolling on the floor |
| | O:) | (angel) | angel |
| | :-B | | nerd |
| | =; | | talk to the hand |

Sample XML Schema

```
<xsd:schema
xmlns:xsd="http://www.w3.org/2001/XMLSchema">
```

Negative and forceful 805a

```
    <xsd:enumeration value="anger"/>
    <xsd:enumeration value="annoyance"/>
    <xsd:enumeration value="contempt"/>
    <xsd:enumeration value="disgust"/>
    <xsd:enumeration value="irritation"/>
```

Negative thoughts 805b

```
    <xsd:enumeration value="doubt"/>
    <xsd:enumeration value="envy"/>
    <xsd:enumeration value="frustration"/>
    <xsd:enumeration value="guilt"/>dai
    <xsd:enumeration value="shame"/>
```

Negative and passive 805c

```
    <xsd:enumeration value="boredom"/>
    <xsd:enumeration value="despair"/>
    <xsd:enumeration value="disappointment"/>
    <xsd:enumeration value="hurt"/>
    <xsd:enumeration value="sadness"/>
```

Agitation 805d

```
    <xsd:enumeration value="shock"/>
    <xsd:enumeration value="stress"/>
    <xsd:enumeration value="tension"/>
```

Positive and lively 805e

```
    <xsd:enumeration value="amusement"/>
    <xsd:enumeration value="delight"/>
    <xsd:enumeration value="elation"/>
    <xsd:enumeration value="excitement"/>
    <xsd:enumeration value="happiness"/>
    <xsd:enumeration value="joy"/>
    <xsd:enumeration value="pleasure"/>
```

Caring 805f

```
    <xsd:enumeration value="affection"/>
    <xsd:enumeration value="empathy"/>
    <xsd:enumeration value="friendliness"/>
    <xsd:enumeration value="love"/>
```

Reactive 805g

```
    <xsd:enumeration value="interest"/>
    <xsd:enumeration value="politeness"/>
    <xsd:enumeration value="surprise"/>
</xsd:schema>
```

FIG. 8

INSTANT MESSAGING APPLICATION CONFIGURATION BASED ON VIRTUAL WORLD ACTIVITIES

CROSS-REFERENCE TO RELATED APPLICATIONS

This application is a continuation of and claims the benefit of priority to U.S. patent application Ser. No. 14/462,500, filed on Aug. 18, 2014, which is a continuation of and claims the benefit of priority to U.S. Nonprovisional patent application Ser. No. 11/937,345, filed on Nov. 8, 2007, which claims the benefit of priority from U.S. Provisional Patent Application No. 60/864,898, filed on Nov. 8, 2006, each of which is incorporated herein by reference in its entirety.

TECHNICAL FIELD

The document relates generally to a system and method for using a text-based client to navigate and interact with a virtual world.

BACKGROUND

Users rely on a variety of applications to exchange information with other users.

DESCRIPTION OF FIGURES

FIG. 5 illustrates a table of exemplary emoticons and associated text triggers.

FIG. 8 illustrates an exemplary XML schema for expressing intermediate paralinguistic descriptions.

DETAILED DESCRIPTION

Figure 1:
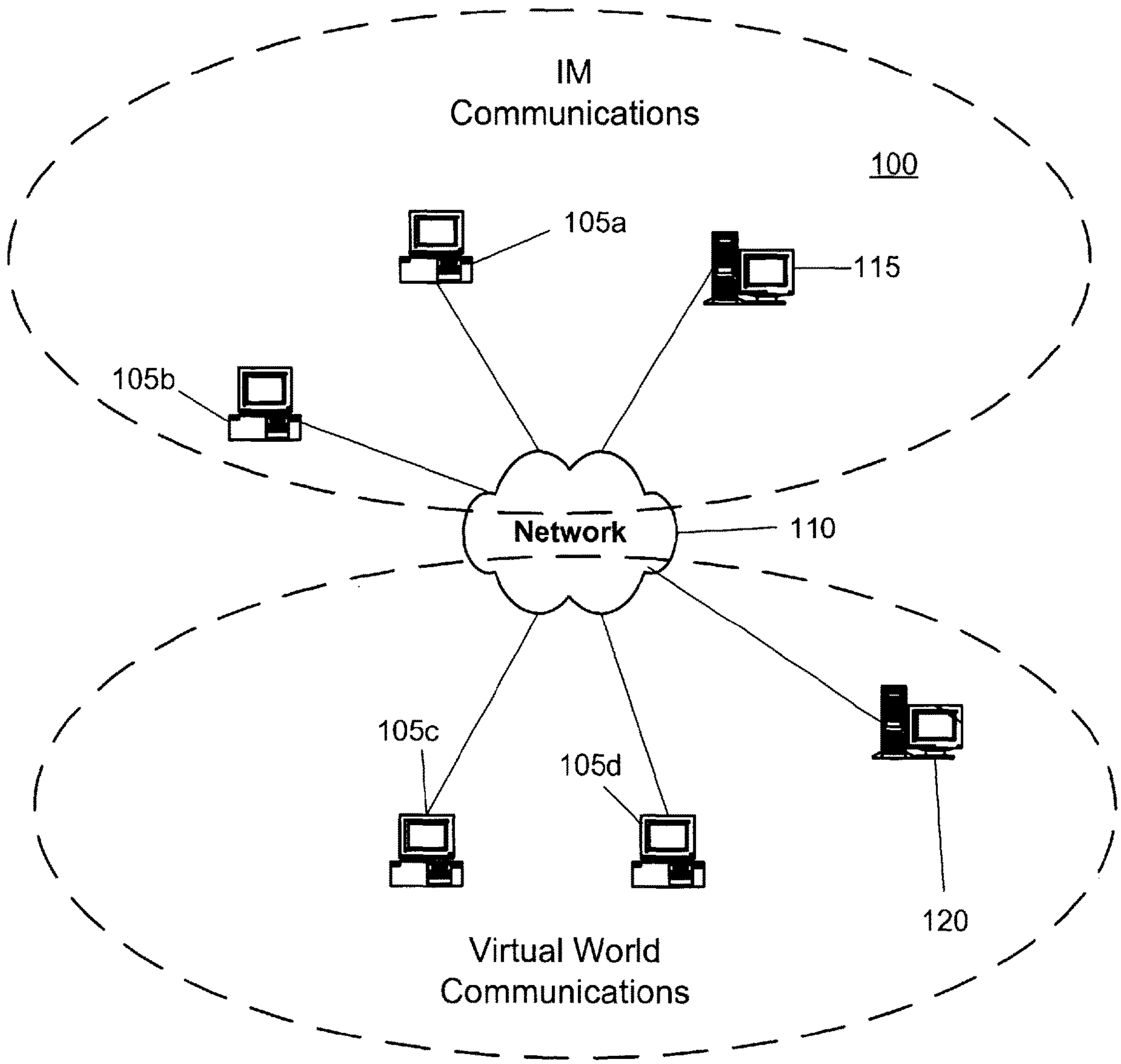
FIG. 1 illustrates an exemplary network computing environment enabling communications between users of instant messaging clients and virtual world clients.

A user accesses an instant messaging client that interfaces with an instant messaging server to exchange communications with virtual world users (e.g., users participating in "Second Life"). More precisely, a particular user maintains an instant messaging participant list (e.g., an AOL Instant Messenger Buddy List™) that is configured to identify the online status of other virtual world users and enable communications with the other virtual world users. An avatar in virtual world is maintained for the instant messaging user and information related to the avatar's presence in virtual world is accessed. The user need not enter an immersive, virtual world environment in order to access and maintain the avatar. Rather, a proxy agent on an instant messaging server may be configured to control the avatar in the virtual world. The avatar's environment may be accessed and analyzed. Based on information related to the virtual world, another persona (e.g., another virtual world avatar) from the virtual world that exhibits a threshold degree of similarity to the persona adopted by the particular instant messaging user in the virtual world is identified. For example, proximate and like-minded users may be identified. In response to identifying the other persona from the virtual world that exhibits a threshold degree of similarity to the persona adopted by the particular instant messaging user in the virtual world, an instant messaging label for the other persona from the virtual world is accessed. Thus, a screen name for a like-minded user may be created. The instant messaging label for the like-minded user is added to the user's instant messaging participant list so that the instant messaging user may exchange communications with the virtual world user. In one configuration, the instant messaging participant list is configured to dynamically present a special folder that includes contact information (e.g., screen names) for proximate virtual world users with similar interests.

For illustrative purposes, FIGS. 1-8 illustrate a system for translating paralinguistic indicators at a paralinguistic translation server. A user of a virtual world (VW) system, who operates an avatar inside the virtual world, communicates with a user of an instant messaging (IM) system. For example, the VW user may wish to express a set of emotions or actions through the behavior of an avatar and have these emotions/actions communicated to the IM user. Thus, if the VW user is feeling angry, the VW user may communicate an angry mood through some actions of her avatar. Consequently, paralinguistic indicators of the VW user's avatar (e.g., gesticulations, actions, or facial expressions) are encoded as a set of data and transmitted from the VW system to the paralinguistic translation server. The paralinguistic translation server translates paralinguistic indicators of the VW system into the paralinguistic indicators of the IM system. For example, the paralinguistic translation server evaluates the avatar's paralinguistic indicators and translates these indicators into the synonymous paralinguistic indicator(s) in the IM system, such as an "angry face" emoticon, which is then added to an instant message and transmitted to the IM user.

FIG. 1 illustrates an exemplary networked computing environment 100 enabling communications between users of instant messaging (IM) clients and virtual worlds (VWs) clients. Users are distributed geographically and communicate using client systems 105*a*-105*d*. For example, users operating client systems 105*a* and 105*b* are utilizing instant IM clients to communicate with each other and virtual world users 105*c*-105*d*. Similarly, users operating client systems 105*c*-105*d* are communicating within a virtual world and also with users outside of a virtual world. A virtual world presents an interactive three-dimensional (3D) graphical scene to users 105*c*-105*d*, such that users 105*c*-105*d* may interact with the world and each other through textual, audio, and/or graphical communications. A network 110 interconnects client systems 105*a*-105*d*, which connect to network 110 through various communication mediums, such as a modem connected to a telephone line (using, for example, serial line internet protocol (SLIP) or point-to-point protocol (PPP)) or a direct inter-network connection (using, for example, transmission control protocol/internet protocol (TCP/IP)).

Each of the client systems 105*a*-105*d* may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 105*a*-105*d* may receive instructions from, for example, a software application, a client, a piece of code, a device, a computer, a computer system, or a combination thereof, which independently or collectively direct operations, as described herein. These instructions may take the form of one or more communications clients that facilitate communications between the users of client systems **105*a*-105*d*. For instance, such communications clients may include electronic mail (e-mail) clients, IM clients, virtual world clients, or voice-over-IP clients. The instructions may be embodied permanently or temporarily in any type of machine, component, equipment, storage medium, or propagated signal that is capable of being delivered to the client systems 105*a*-105*d***.

Client systems **105*a*-105*d* include a communications interface (not shown) used by the communications clients to send communications through network 110**. The communications may include e-mail, audio data, video data, general binary data, or text data (e.g., data encoded in American Standard Code for Information Interchange (ASCII) format).

The network 110 typically includes a communications infrastructure facilitating communications between the different client systems, and may include one or more hosts. Examples of the network 110 include the Internet, Wide Area Networks (WANs), Local Area Networks (LANs), analog or digital wired and wireless telephone networks (e.g., a Public Switched Telephone Network (PSTN)), an Integrated Services Digital Network (ISDN), or a Digital Subscriber Line (xDSL)), or any other wired or wireless network. The network 110 may include multiple networks or subnetworks, each of which may include, for example, a wired or wireless data pathway.

Computing environment 100 also includes an instant messaging (IM) server 115 and a virtual world (VW) server 120 that are connected to network 110. The IM server 115 and the VW server 120 are used to facilitate direct or indirect communications between the client systems **105*a*-105*d*. As with the client systems 105*a*-105*d*, the IM server 115 and the VW server 120 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The IM server 115 and the VW server 120 may receive instructions from, for example, a software application, a client, a piece of code, a device, a computer, a computer system, or a combination thereof, which independently or collectively direct operations, as described herein. These instructions may take the form of one or more communications clients. Such communications clients may include, for example, e-mail clients, VW clients, IM clients, and voice-over-IP clients. The instructions may be embodied permanently or temporarily in any type of machine, component, equipment, storage medium, or propagated signal that is capable of being delivered to the IM server 115 and the VW server 120**.

Further, the IM server 115 and the VW server 120 include communications interfaces (not shown) used by the communications clients to exchange communications through network 110. The communications may include different forms of data, such as e-mail data, audio data, video data, general binary data, or text data.

Figure 2:
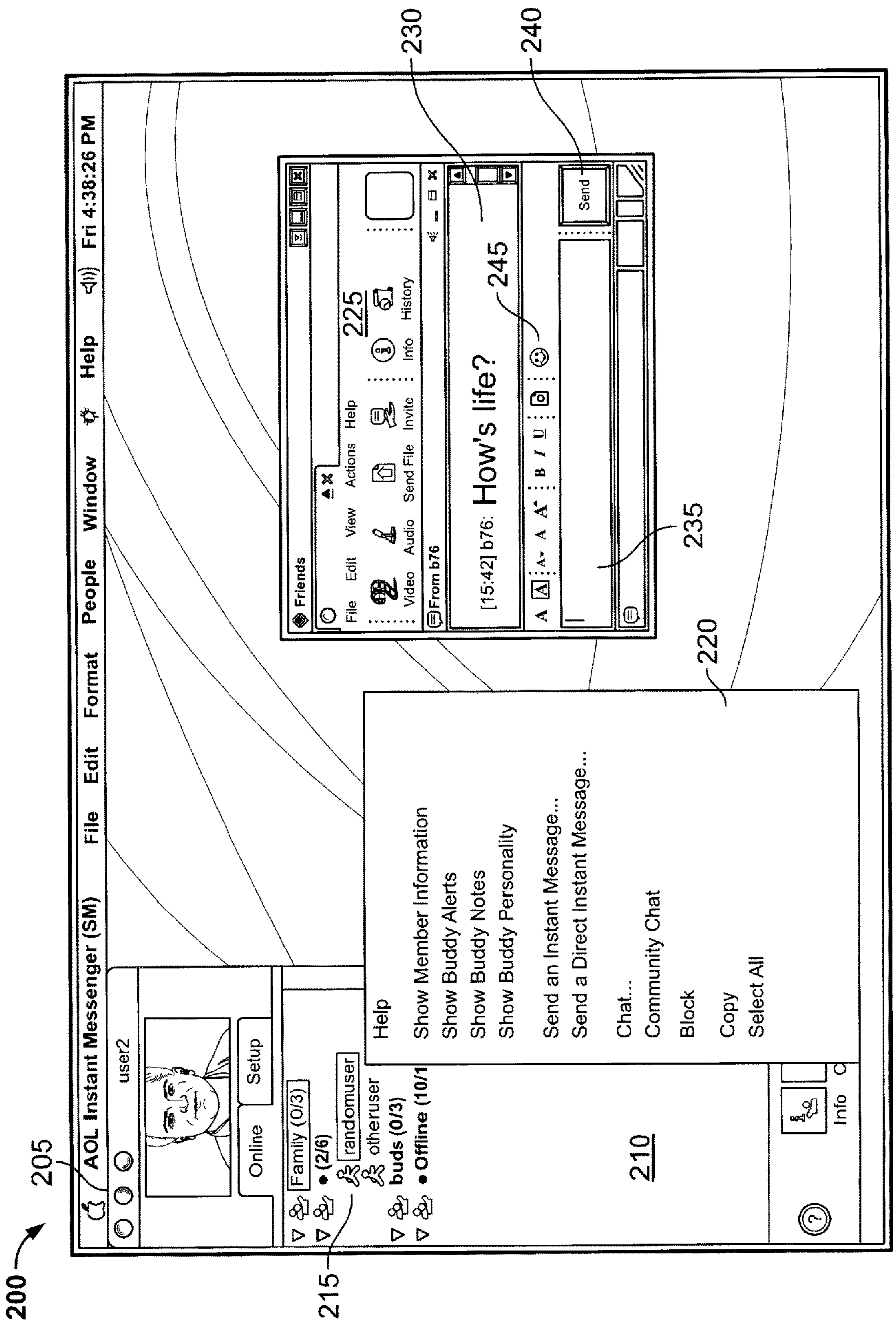
FIG. 2 illustrates an exemplary instant messaging interface presented to a user of an IM client.

FIG. 2 illustrates an exemplary instant messaging interface presented to a user of one of the client systems, such as the client system **105*a***. The IM client enables a user to communicate in real-time with other users using text and other input. For example, the IM client enables the user to send text communications in an instant message, transfer files, and communicate using voice. Examples of IM clients include those provided by AOL (America Online's AOL Instant Messenger (AIM)), Yahoo Messenger, MSN Messenger, and ICQ.

As shown, the IM system 200 presents a user with an IM user interface 205. User interface 205 includes a text box 210 that displays representations 215 of the user's contacts (e.g., an AIM Buddy appearing in an AIM BuddyList™), which are other users participating in an IM system by executing an IM client on another client system. For instance, in the exemplary interface shown, there are representations for two contacts, "randomuser" and "otheruser." The representations 215 provide status information for the user about the contact, such as whether the contact is online, how long the contact has been online, whether the contact is away, or whether the contact is using a mobile device.

The list of contacts displayed in text box 210 of user interface 205 may be referred to as a list of co-users, and the IM client user may add or remove contacts from the contact list. In the example shown, the representations 215 are rendered as icons showing the screen names of the contacts.

The IM clients may use the IM server 115 to assist in communications between users of the IM clients. The IM server 115 may be configured to interact with a different IM services irrespective of which IM client is being used. The IM server 115 also may support associated services, such as administrative matters, advertising, directory services, chat, and interest groups related to instant messages.

To facilitate the transfer of data, the IM server 115 may implement one or more standard or proprietary IM protocols. The one or more protocols may enable the IM server 115 to facilitate the establishment of a peer-to-peer communication session between the IM client clients, or assist IM communications by directly routing communications between the IM client clients.

To engage in IM communications when using an IM server 115, an IM client on one of client systems **105*a*-105*d* establishes a connection with the IM server 115**, authenticating itself in the process. Once the IM client has been authenticated, the IM client indicates whether a particular contact is online, exchange IMs with particular contacts, participate in a group chat room, or trade files, such as pictures, invitations or documents. The user also may be able to find other users with similar interests, get customized information such as news and stock quotes, and search the World Wide Web.

When a contact is online, the user may communicate or interact with the contact in a number of ways. For instance, the user can send an instant message to the contact (typically in the form of text). Sending a message opens up a window 225 in which messages can be typed and viewed as they are communicated back-and-forth between the user and the contact. Window 225 includes a text box 230 and an edit box 235. The sent and received messages of the user are displayed in text box 230. The sender's (i.e., user's or contact's) screen name may be listed beside the sender's corresponding message in text box 230. For instance, in the exemplary window shown, the user (whose screen name is "randomuser") has received a message "How's life?" from the contact (whose screen name is "b76"). To send a reply message, the user types the message in edit box 235 and activates a send command, for example, by pressing an ENTER key or selecting on a Send icon 240. In addition, an emoticon link 245 may be selected from window 225 to display a tool for specifying emoticons that are available when communicating with the contact. Generally, emoticons are two-dimensional images that are sent when certain triggers are included in the text of an instant message, as will be further discusses with respect to FIG. 5. For example, the character sequence ;) may be displayed as a "winking" smiley face. As a result of entering an emoticon, the entered text, along with the emoticons, is displayed in text box 230 within contact's user interface.

Figure 3:
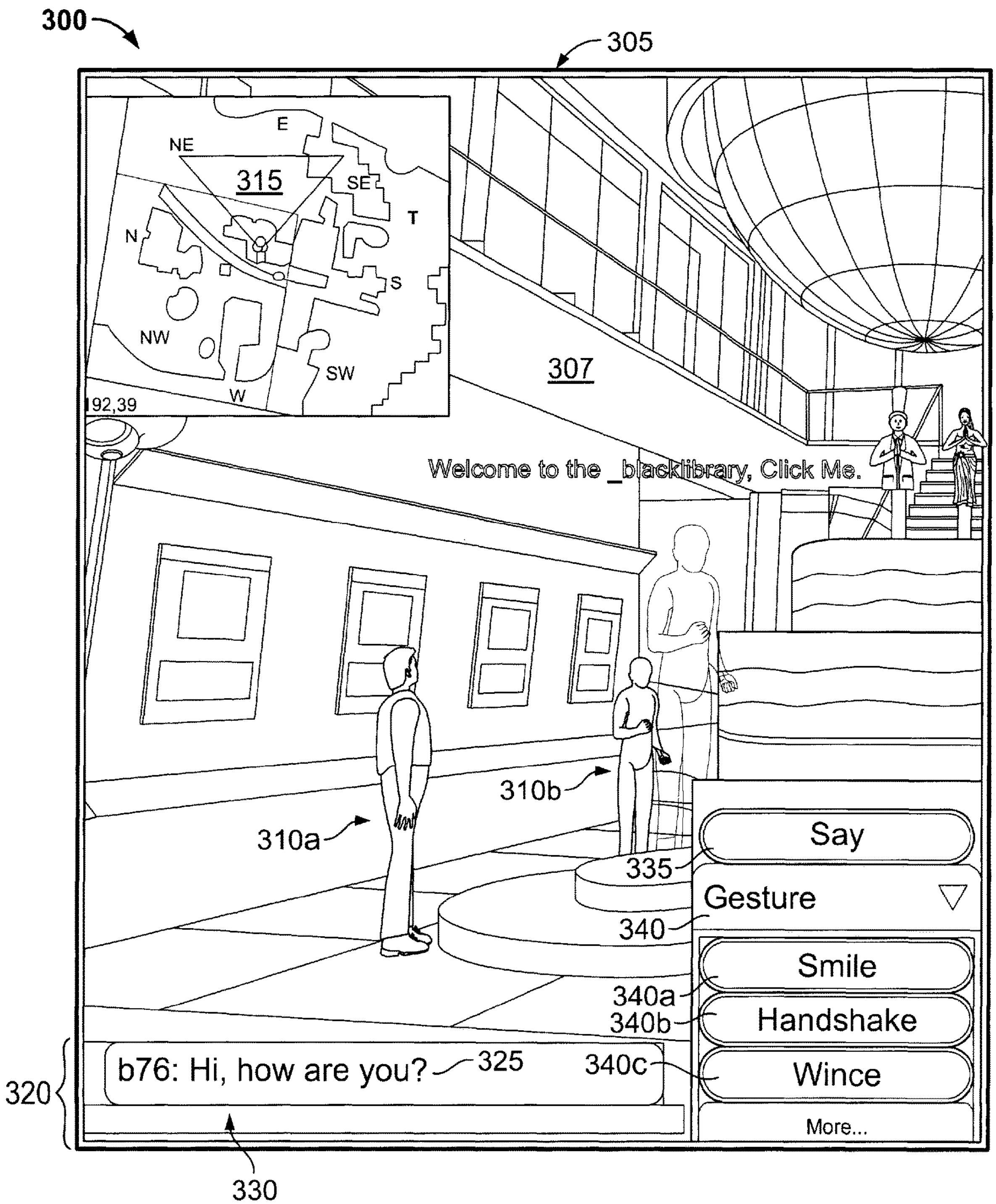
FIG. 3 illustrates an exemplary virtual world interface.

In addition to instant messaging, users of a network computing environment 100 may interact with each other inside a virtual world (VW) environment. FIG. 3 illustrates an exemplary virtual world interface presented to users of the virtual world environment, such as users 105*c*-105*d* of FIG. 1. Users 105*c*-105*d* may interact in shared, three-dimensional virtual world through their respective avatars 310*a*-310*b*, which are graphical representations of users in the virtual world system 300. Users 105*c*-105*d* control their avatars through an interface of a VW client 305. For example, the interface 305 enables users to cause their respective avatars 310*a*-310*b* to travel around, gesticulate, or communicate with other avatars within the virtual world via text messages, voice, or movements. In addition, VW users may direct their avatars 310*a*-310*b* to interact with the 3D graphical scene in the virtual world by creating, moving, or touching various objects and scene elements. Examples of VW clients include "Second Life" by Linden Research, Inc. and "Virtual Worlds" by Microsoft.

As shown, a virtual world system 300 presents a user with a VW client interface 305. User interface 305 has a graphical view box 307, which displays the 3D scene of the virtual world from a point of view of the user's avatar. In addition, user interface 305 has a high-level, topological map of the virtual world 315, which may show users 105*c*-105*d* the current location of their avatar on the overall map of the virtual world and also may allow users 105*c*-105*d* to quickly zoom in to the specific locations within the virtual world.

VW users 105*c*-105*d* can communicate or interact with the virtual world in a number of ways. For instance, the user 105*c* can send a message to the user 105*d* (typically in the form of text). Sending a message is done by typing the message in a messaging window 320. The messages may be perceives as the messages are exchanged. Messaging window 320 includes a text box 325 and an edit box 330. For example, the sent and received messages of the user 105*c* are displayed in text box 325. A user's screen name may be listed beside the avatar's corresponding message in text box 325. For instance, in the exemplary window shown, the user 105*c* has received a message "Hi, how are you?" from the user 105*d* (whose screen name is "b76"). To send a reply message, the user 105*c* types the message in edit box 330 and activates a send command by, for example, pressing an ENTER key.

Users speak to each other and other users by using voice communications. For example, the user 105*c* may press a "Say" button 335 and begin a voice communications session with the user 105*d*. In addition, users 105*c*-105*d* may cause their avatars 310*a*-310*b* to gesticulate to each other and other avatars by selecting from a variety of gestures from a pull-down menu 340. Selecting a gesture from the pull-down menu 340 causes the user's avatar to perform a specific action in the virtual world. For example, the user 105*c* may select a "smile" gesture 340*a* from a list of available gestures 340, which will cause user's avatar 310*a* to smile. The actual number of available gestures or gesture combinations may be quite large. Users 105*c*-105*d* may be able to cause their avatars to express a wide range of emotions, such as happiness, anger, or tiredness, by selecting from a variety of available gestures. For instance, the user 105*c* may cause avatar 310*a* to wince in pain and rub its belly to indicate a stomachache to the user 105*d*. In addition, a user may customize the expressions presented by their avatar. For example, the avatar may modify a profile to configure certain facial configurations to be associated with a specified trigger and/or mood. Alternatively or in addition, the user may specify an intensity of emotion that lies within an intensity spectrum. For example, a user may interact with a control mechanism numbered from 0 until 1000, where 0 represents a neutral mood, 100 represents a perturbed mood, 200 represents being upset, up until a value of 1000 (representing extreme anger). Each of the numbers may represent a setting for a facial expression (e.g., an intensity of a facial expression such as a furrowed brow). In the case where the furrowed brow reflects the mood, a first "range of motion" to a first position may represent progressive moods from 0-100 while a second "range of motion" may represent more extreme moods to a second position.

In yet another example, users 105*c*-105*d* may control their avatars through the use of video with face/gesture tracking software. For example, users 105*c*-105*d* may configure a desktop video camera to track user actions and expressions in the real world and translate these actions to the avatar actions in the virtual world. Thus, for example, when the user 105*c* smiles and waives his hand in front of the webcam, the face/gesture tracking software will detect these actions of the user 105*c* and cause his avatar to smile and waive a hand in the virtual world.

The VW clients may use a virtual world server 120 to assist in communications between users of the VW clients. The VW server 120 may support VW services irrespective of a client user's network or Internet access. Thus, for example, VW server 120 may allow users to communicate with other users, regardless of whether they have access to any particular Internet service provider (ISP). The VW server 120 also may support associated services, such as billing, administrative matters, advertising, and directory services related to the virtual world.

To facilitate the transfer of data, the VW server 120 employs one or more standard or proprietary VW communication protocols. The one or more protocols may enable the VW server 120 to facilitate the establishment of a peer-to-peer communication session between the VW client clients, or assist VW communications by directly routing communications between the VW client clients.

To engage in VW communications when using the VW server 120, a VW client running on one of client systems 105*c*-105*d* establishes a connection with the VW server 120 and authenticates. Once authenticated, VW users 105*c*-105*d* may use the VW client to create or modify their avatars 310*a*-310*b*, communicate with other VW users through avatars 310*a*-310*b*, or interact with the environment of the virtual world through avatars 310*a*-310*b*. For example, the user 105*c* may build a "virtual" object, such as a house, and rent this house to the user 105*d* for a fee. Then, the avatar 310*b* of the VW user 105*d* is able to inhabit the newly-built house and interact with the objects stored in the house.

VW users 105*c*-105*d* may communicate with the users outside of the virtual world, such as IM users 105*a*-105*b*. This communications may be accomplished by sending instant messages between VW users 105*c*-105*d* and IM users 105*a*-105*b*. Such communications may be either unidirectional or bidirectional—that is, VW users may send messages to IM users and/or IM users may send messages to VW users. Alternatively or in addition, such communications may include email, instant messages, voice communications, chat communications, voice-over-IP, or other communications.

Figure 4:
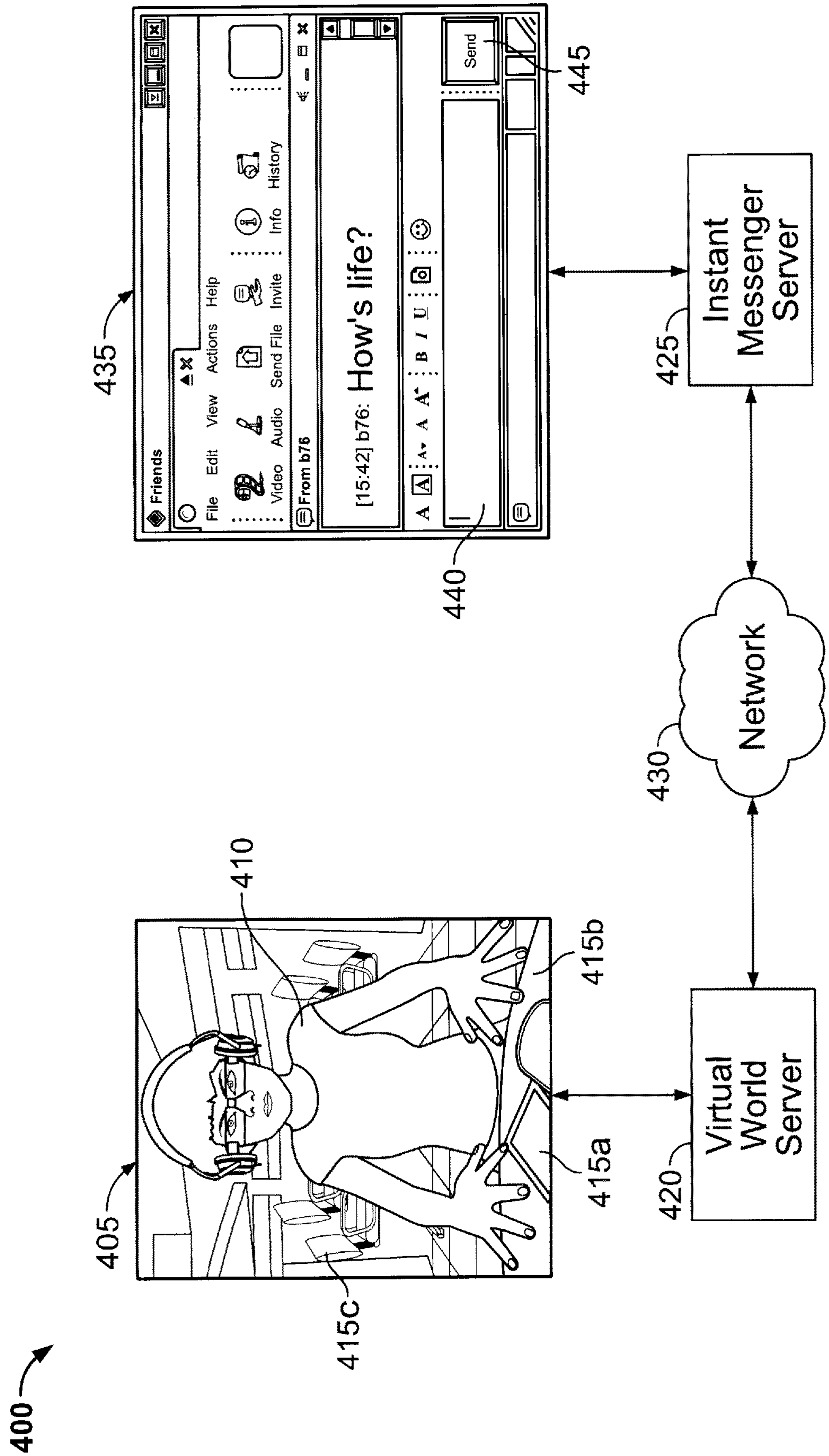
FIG. 4 illustrates communications between an instant messaging system and a virtual world system.

For example, FIG. 4 illustrates communications between an IM system 200 and a virtual world system 300. The VW user 105*c* may interact with the virtual world through a user interface of the VW client 405, which is similar to the previously discussed interface 305. The user 105*c* is represented in the virtual world by her avatar 410. As described with respect to FIG. 3, actions of the avatar 410 are controlled by the user 105*c* through the interface of the VW client 405. Here, for example, user 105*c* has directed her avatar 410 to read a book in a virtual library. Hence, avatar 410 is surrounded by a rich graphical environment representative, which includes books 415*a*, tables 415*b*, and chairs 415*c*. Avatar 410 may interact with any of these and other virtual objects.

The user 105*c* may wish to communicate with the IM user 105*a*. In this case, she sends a message from the VW interface 405 to the IM client of the IM user 105*a*. For instance, in the exemplary window shown, the VW user 105*c* (whose screen name is "b76") has sent a message "How is life?" to the IM user 105*a*. The sent message passes from the VW server 420 to the IM server 425 by way of the network 430, all of which have been described previously with respect to FIG. 1. The message is displayed to the IM user 105*a* through an interface of the IM client 435, which has also been described previously with respect to FIG. 1. To send a reply message to the VW user 105*c*, the IM user 105*a* may type the message in edit box 440 and press an ENTER key or click on a Send icon 445.

Communications between the virtual world and text-based clients, such as instant messaging or email, may suffer in at least one respect. The range of avatar emotions, gestures, or moods displayed in a graphical virtual world system may be much "richer" than a similar range of emotions available in a text-based system. In a virtual world, users may be able to express a wide range of their emotions or moods, such as happiness, anger, or tiredness, by choosing a variety of non-verbal indicators for their avatars, including gestures, actions, or facial expressions. These indicators, known as paralinguistic indicators, describe the non-verbal elements of communication used to modify meaning and convey emotion. Thus, in the virtual world communications, paralinguistic elements may be expressed by the avatar's facial expressions, gestures, and/or interactions with the surrounding virtual environment.

Similarly, in the text-based communications users have traditionally conveyed their emotions by placing specific paralinguistic indicators within email, chartroom, or instant messages. However, in contrast to the virtual world communications, the paralinguistic indicators in the text-based communications may be more constrained in their scope and expressiveness. For example, text-based paralinguistic elements may be displayed by emoticons, font or color choices, capitalization and the use of non-alphabetic or abstract characters. In particular, emoticons are two-dimensional non-animated images (and sometimes non-animated) that are sent when certain triggers are included in the text of an email, a chat room message, or an instant message. A trigger may include any letter, number, or symbol that may be typed or otherwise entered using a keyboard or keypad. For example, a user may indicate her mood by sending a "smiley face" emoticon by including a ":-)" trigger in the message. In another example, a user may indicate that the user is shouting by capitalizing a message.

Referring to FIG. 5, a table 500 of text-based triggers associated with the commonly used emoticons 505 is shown. Each of the emoticons 505 has multiple associated triggers 510 or 515 which convey a specific meaning 517. More particularly, by way of example, the emoticon 520*a*, in which the avatar is made to smile, has associated triggers 520*b*-520*c*. Each of the triggers 520 includes multiple character strings. In particular, triggers may be include "sideways" expression triggers 520*a*, such as ":)" and ":-)", and English words, such as a "Nice" trigger 520*b*. Other examples of a trigger include a particular abbreviation, such as "lol," and an English phrase, such as "Oh no." As discussed previously, when one of the triggers is included in an instant message, the corresponding emoticon is sent in that instant message. In one example, when "Nice" is included in an instant message, the smiling emoticon is sent. In another example, when a user includes a ":P" text trigger in the instant message, a two-dimensional image of a smiley sticking a tongue out is sent to a recipient of the instant message.

When the VW user 105*c* communicates with the IM user 105*a*, paralinguistic indicators used in the virtual world (e.g., gesticulations, actions, facial expressions) are translated to the paralinguistic indicators used in the IM communications using, for example, emoticons or a description of the avatar in the VW. Similarly, paralinguistic indicators included in the communications from the IM user 105*a* to the VW user 105*c* also may be translated.

Figure 6:
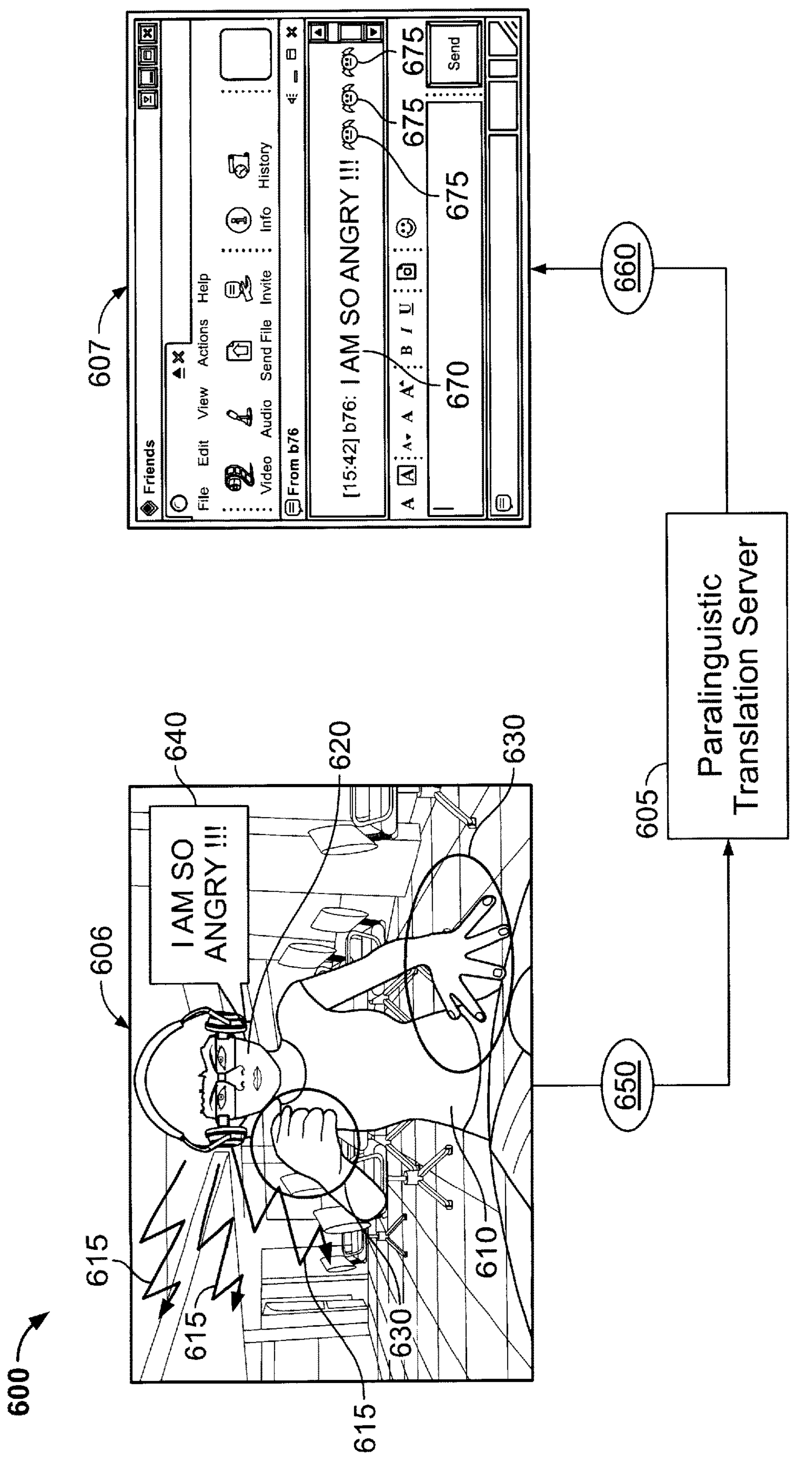
FIG. 6 illustrates a translation of paralinguistic indicators during communications between instant messaging system and a virtual world system.

FIG. 6 illustrates a system for translating paralinguistic indicators at a paralinguistic translation server 605. A user of a virtual world (VW) system 606 (previously described with respect to FIG. 3) is communicating with a user of an IM system 607 (as was previously described with respect to FIG. 2). The VW user operates an avatar 610 inside the virtual world. At some point, the VW user may wish to express a set of emotions or actions through the behavior of avatar 610 and have these emotions/actions communicated to the IM user. For example, if the VW user is feeling angry, the VW user may communicate an angry mood through actions of her avatar 610. The VW user may express her "virtual emotions" in a variety of ways. For instance, the VW user may indicate her anger by displaying the lighting bolts 615 around her avatar's face. In addition, a facial expression 620 of the avatar 610 and specific gesticulations, such as banging fists on the table 630, also may indicate an angry mood. Alternatively or in addition, the VW user may send a text message through the message window 640, where the contents, fonts, or colors of the text message itself may indicate a specific mood. For example, capitalization or very large fonts may indicate screaming. In yet another example, certain emotionally-charged words, such as "happy" or "angry", may indicate the communicated emotions when they appear in the text message. The VW user also may utilize voice communications to communicate with the IM user. In that case, the actual content of the voice communications as well as audio qualities of the voice communications, such as volume or pitch, may be analyzed to determine the emotions/moods. The above indicators of emotions/moods are only exemplary. Other paralinguistic indications of moods/emotions may be used and also may depend on the specific environment of the virtual world system and the desires of the VW user.

The paralinguistic indicators are encoded as a set of data and transmitted from the VW system 606 to the paralinguistic translation server 605 (650). The set of data specifying the paralinguistic indicators within the VW system 606 is received at the paralinguistic translation server 605. Subsequently, the paralinguistic translation server 605 translates paralinguistic indicators of the VW system 606 into the paralinguistic indicators of the IM system 607, such that the translated paralinguistic indicators of the IM system 607 are at least partially synonymous to the received paralinguistic indicators of the VW system 606. Therefore, the translated paralinguistic indicators reflect the content of the received paralinguistic indicators of the VW system 606. The translated paralinguistic indicators may reflect a robust set of content or just partial content, depending on a degree of translation.

In this example, the paralinguistic translation server 605 receives the set of data related to the avatar's mood in the VW system 606. The paralinguistic translation server 605 may evaluate the avatar's angry face 610, the lightning bolts surrounding the avatar 615, the hand gestures 630*a*-630*b*, or the actual content and capitalization of the message 640 ("I AM SO ANGRY!!!), and translate the virtual world's paralinguistic indicators into the synonymous paralinguistic indicator in the IM system 607, such as an "angry bat" emoticon.

The translated emoticon is converted to a set of data related to the paralinguistic indicator in the IM system 607. For example, the paralinguistic translation server may encode the "angry bat" emoticon in such a combination of text triggers that would cause the IM system 607 to display one or more "angry bat" emoticons 675 on the IM interface 670 when the instant message 670 "I AM SO ANGRY" is received at the IM system 607.

Finally, the paralinguistic translation server transmits the set of data related to the translated paralinguistic indicator (e.g., "angry bat") to the IM system 607 (660). For example, the text triggers related to the "angry bat" emoticon 675 are transmitted along with the text 670 of the instant message to the IM user. When the IM user receives the instant message from the VW user, the IM user sees not only the text 670 of the IM, but also the emoticons 675 displayed by the IM client. These emoticons are at least partially synonymous to the paralinguistic indicators (e.g., emotions, moods, actions, etc) of the VW user's avatar in the virtual world.

The above example demonstrated translation of paralinguistic indicators from the virtual world system to the instant messaging system. Additionally or alternatively, a similar translation may be used to translate communications from the IM system 607 to the VW system 606. For example, the user of the IM system 607 may type a message that includes some paralinguistic indicators, such as smiley faces. The instant message is then transmitted to the user of the VW system 606. In the course of processing the message, the paralinguistic indicators in the instant message are translated at the paralinguistic translation server 605 so that the VW user, in response to receiving an instant message from the IM user, may observe the translated paralinguistic indicators in the virtual world environment. For instance, if the IM user is represented by an avatar in the virtual world, the avatar displays emotions/actions that are at least partially synonymous to the meaning of the paralinguistic indicator in the instant message. Thus, if the IM user transmits a winking emoticon (";-)") to the VW user, the avatar for the IM user also may wink in the virtual world. In addition to the previously-described paralinguistic indicators, the IM user also may provide a variety of textual commands to control the behavior of his avatar in the virtual worlds. For instance, a user may type "lol," "ROTFL" or <bang fists>, or <take 3 steps> or other combination of text-triggers/commands to cause his avatar to perform at least partially synonymous actions in the virtual world.

Figure 7:
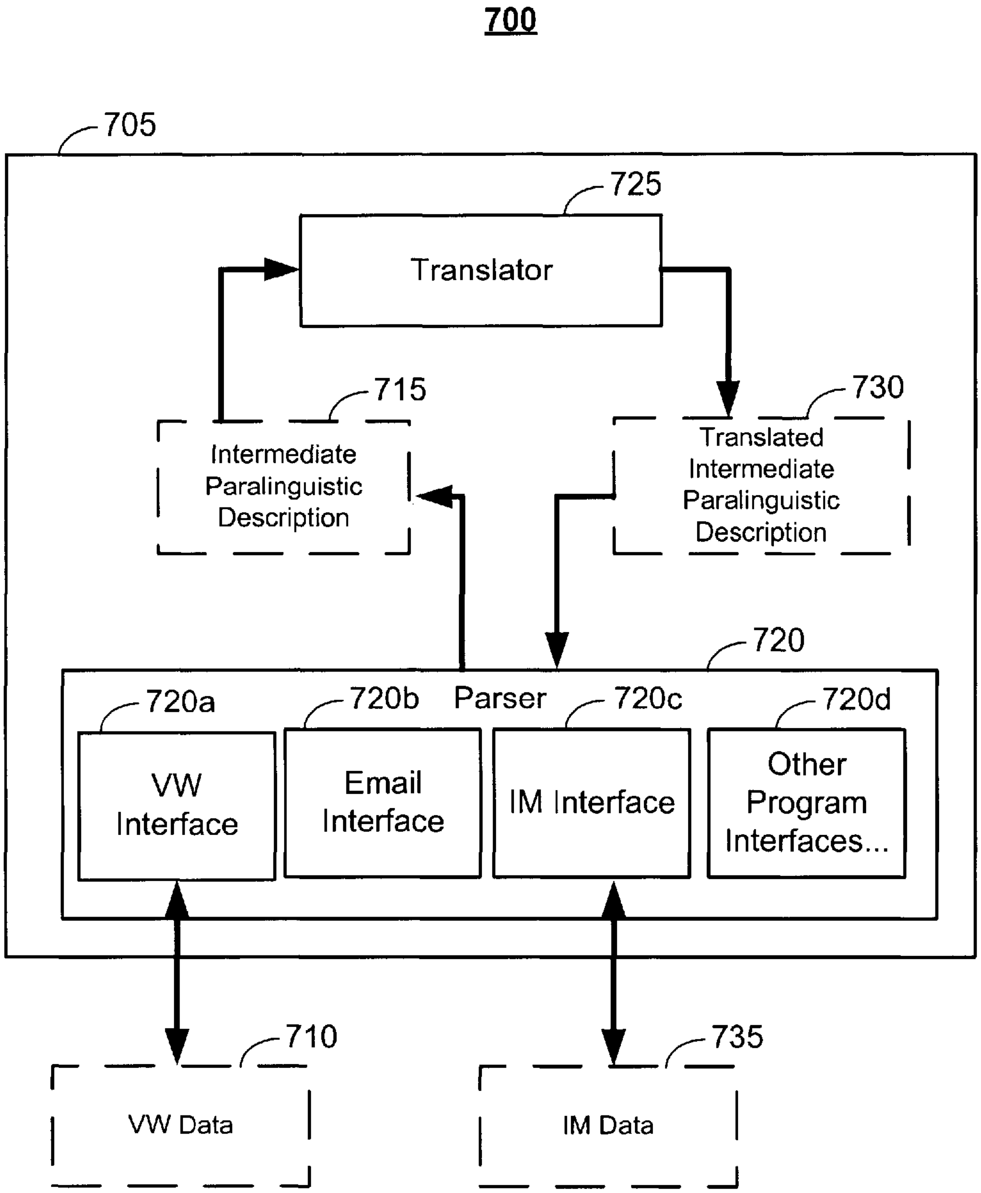
FIG. 7 is a block diagram of a paralinguistic translation server.

FIG. 7 illustrates an exemplary paralinguistic translation server 705. Paralinguistic translation server 705 is structured and arranged to receive from a source a first set of data 710 related to a first paralinguistic indicator that is intended to enable non-verbal communications between a source and a destination, wherein the source is one of an instant messaging system and a virtual world system and the destination is one of the textual instant messaging system and a virtual world system but differs from the source. For example, the paralinguistic translation server 705 receives the data set 710, which describes paralinguistic indicators in the virtual world. Data set 710 may be specified in an Extensible Markup Language (XML), HTML, Python, the format used by the VW client, or any other open or proprietary format or scripting language. Data set 710 also may include a combination of text data, voice data, and video data.

Before proceeding to translate paralinguistic indicators, the paralinguistic translation server 705 first converts the received data 710 to an intermediate paralinguistic description. The conversion may use an intermediate paralinguistic description because protocols and formats used by different VW clients or IM clients are incompatible. Thus, a Yahoo instant messenger client and an AIM client may require different text triggers to elicit the same emoticon. Similarly, different virtual world clients also may use proprietary/incompatible formats related to the paralinguistic indicators. Therefore, paralinguistic translation server 705 may decode data sets expressed in different formats into the common format before proceeding with the actual translation. Operating on data sets in the common format enables a paralinguistic translation server 705 to translate the abstract meaning between paralinguistic indicators of different clients while avoiding additional complexity that may result from a requirement to operate in the particularities of the clients' data formats.

Paralinguistic translation server 705 decodes data set 710 into the intermediate paralinguistic description 715 using a parser 720. The parser 720 includes parsing interfaces 720*a*-720*d*. Parsing interfaces 720*a*-720*d* are capable of decoding data sets related to paralinguistic indicators from various instant messaging, email, or virtual world clients, and converting the decoded data sets into a common intermediate paralinguistic format. Alternatively or in addition, parsing interfaces 720*a*-720*d* may be used to convert data specified in the common intermediate paralinguistic format back into the specific formats used by the various instant messenger, email, or virtual world clients. Thus, the parser 720 may include interfaces 720*a*-720*d* for encoding or decoding data sets using a proprietary IM interface. Alternatively or in addition, the parser 720 may include interfaces for encoding or decoding data sets using the proprietary interfaces of different VW clients, such as Second Life.

Intermediate paralinguistic description 715 may be expressed in an XML-based format. One illustrative example of an XML-based format for describing paralinguistic indicators is Emotion Annotation and Representation Language (EARL), currently in development by the W3 community. The XML-based format for describing paralinguistic indicators may include emotional tags for specifying emotions. Both simple and complex emotions may be specified. In addition, emotions may be grouped by categories, such as "negative and passive", "agitated," or "caring."

The XML-based format for describing paralinguistic indicators may be capable of describing a variety of emotional states by using emotional tags of varying complexity. A simpler emotional tag utilizes various attributes to specify a category, dimensions (e.g., intensity) and/or appraisals of a single emotional state. Emotional tags may include text, links to other XML nodes, or specify a time span using start and end times to define their scope.

In one implementation, an emotional tag may specify a homogenous emotion. For example, referring back to FIG. 6, the following XML tag may describe a simple angry emotion in the message 640:

<emotion category="anger">I AM SO ANGRY!!!</emotion>

On the other hand, a more complex emotional tag describes an emotion that is composed of several emotions. For example, complex emotions may be used in cases where two or more emotions co-occur, or situation where one emotion is masked by the simulation of another one. The table below specifies an exemplary XML schema for specifying complex emotions. Each complex emotion can have different intensity, modality, or probability. The intensity variable specifies the intensity of the emotion. The modality variable specifies how the emotion is expressed—e.g., the emotion may be expressed through speech, facial expressions, or specific body gestures. The probability variable assigns a probability to an event that a specific emotion will occur or is actually occurring. Other attributes of complex emotions, such as time durations for each sub-emotion, may be used.

```
<xsd:schema xmlns:xsd="http://www.w3.org/2001/XMLSchema">
        <xsd:simpleType name="modalityType">
                <xsd:enumeration value="voice"/>
                <xsd:enumeration value="text"/>
                <xsd:enumeration value="face"/>
                <xsd:enumeration value="body"/>
        </xsd:simpleType>
    <xsd:attribute name="modality" type="modalityType"
    use="optional"/>
    <xsd:attribute name="probability" type="xsd:float"
    use="optional"/>
    <xsd:attribute name="intensity" type="xsd:float"
    use="optional"/>
</xsd:schema>
```

For example, the following XML tag may describe a complex angry emotion expressed by the avatar 610 in FIG. 6:

```
<complex-emotion>
    <emotion category="anger" modality="face" intensity="0.5/>
    <emotion category="stress" modality="face" />
     <emotion category="anxiety" modality="body" />
</complex-emotion>
```

As can be seen from the above example, the described complex emotion not only takes into account the facial expressions 620 of the avatar 610, but also its various gesticulations, such as hand movements 630. As a result, a much more complete emotional snapshot may be conveyed for the avatar 610.

The paralinguistic translation server 705 is also structured and arranged to translate a set of data 710, which translates the first paralinguistic indicator into a second set of data 735 related to a second paralinguistic indicator, such that the second paralinguistic indicator is at least partially synonymous to the first paralinguistic indicator. As mentioned above, the translation may be performed on the paralinguistic indicators expressed in the intermediate paralinguistic format 715. However, the translating process also may be performed directly on the data related to the paralinguistic indicators without first converting it to the intermediate paralinguistic format 715. For example, the paralinguistic translation server 705 may translate directly between paralinguistic indicators of the IM and the VW clients if these clients use the same or similar format for describing their paralinguistic indicators.

A variety of methods may be utilized at the paralinguistic translation server 705 for translating between paralinguistic indicators, whether they are expressed in the intermediate paralinguistic format 715 or not. For example, translation tables may be used. That is, direct translations may be identified from/to the paralinguistic indicators (or their intermediate descriptions) of the IM client to/from the paralinguistic indicators of the VW client.

For example, the paralinguistic indicators expressed in the intermediate format 715 may be first matched based on the category of emotions described in the schema shown in FIG. 8 (e.g., "happiness," "anger,"). Next, the paralinguistic translation server selects a synonymous emotion appropriate for the IM client from the same emotional category. However, because the expressive capabilities of the IM client may be limited when compared to the expressive capabilities of the VW client, some complex emotions in the virtual world, especially the ones involving gesticulations or movements may not translate directly into the limited set of emotions available to the IM client. In such cases, the paralinguistic translation server 705 may convert (i.e., downgrade) the complex emotion from the virtual world to either a less complex emotion or a simple emotion for the IM client. In addition, the paralinguistic translation server 705 may add textual descriptions to the paralinguistic indicators to describe or supplement the translated paralinguistic indicators from the virtual world. In situations where the complexity of the emotion expressed in the virtual world is less than the complexity of the available emotion in the IM client, an upgrading conversion may be required. For example, additional parameters may be added to the translated paralinguistic indicator intended for the IM client.

Alternatively or in addition, more complex translation techniques may be used. For example, the paralinguistic indicators may be translated using XSLT (Extensible Stylesheet Language Transformations), by using neural networks that identify similar expressions and emotions (even if not identical), or by utilizing knowledge-based machine translation.

Two examples of translating paralinguistic indicators follow. The first example describes a translation of paralinguistic indicators sent from the IM client to the VW client. The second example describes a translation of paralinguistic indicators sent from the VW client to the IM client.

In the first example, an IM user (e.g., user 120*a* from FIG. 1) sends an angry message to the VW user (e.g., user 105*c* from FIG. 1). Specifically, the IM user 105*a* sends a message to the VW user 105*c*, which includes a ">:-<" trigger indicating an "absolutely livid!" emotion. The paralinguistic translation server 705 receives the instant message, decodes its contents using the IM interface 720*c*, and retrieves the data related to the paralinguistic indicator of the IM user 105*a*. In this example, the data includes a ">:-<trigger. Parser 720 converts the received paralinguistic indicator to the intermediate paralinguistic format 715. For example, because the 'absolutely livid' emotion is more complex than a simple "mad" or "angry" emotion, the paralinguistic translation server 705 may convert "absolutely livid" to the following exemplarily complex emotion:

```
<complex-emotion>
    <emotion category="anger" modality="face" arousal="0.9"
    power="0.6/>
    <emotion category="agitation" modality="face" arousal="0.3"
    power="0.5/>
</complex-emotion>
```

The paralinguistic translation server 705 also adjusts numerical values of the parameters of the complex emotion, such that the complex emotion most closely matches the parameters of the original paralinguistic indicator. Next, the paralinguistic translation server translates the complex emotion expressed in the intermediate paralinguistic format 715 to a synonymous complex emotion 730 that would be appropriate in the virtual world, while taking into the account the visual capabilities of the virtual world. For example, because the avatars in the virtual world are capable of expressing not only facial expressions, but also gesticulations, the paralinguistic translation server may add additional parameters to the complex emotion, such as hand or head movements. Other various facial/physical expressions and actions may be added to fully capture the emotion in the virtual world. The resulting translation may look as the following:

```
<complex-emotion>
    <emotion category="anger" modality="face" arousal="0.9"
    power="0.6/>
    <emotion category="agitation" modality="face" arousal="0.3"
    power="0.5/>
    <emotion category="frustration" modality ="body" arousal="0.4"
    power="0.7/>
    <emotion category="confusion" modality="body"/>
</complex-emotion>
```

Finally, the translated complex emotion expressed as the intermediate paralinguistic description 730 is sent to the parser 720, which uses VW interface 720*a* to encode the intermediate paralinguistic description 730 into the VW format 710. The resulting data 710 related to the paralinguistic indicators, now in the VW format, is then transmitted to the VW server. Consequently, the avatar of the IM user in the virtual world shows an angry face while also displaying some frustrated hand gestures.

In the second example, VW user 105*c* communicates with the IM user 105*a*. For example, the VW user 105*c* places his avatar in an elated mood. In addition, the VW user 105*c* makes his avatar display various celebratory hand gestures, such as "high fives." The paralinguistic translation server 705 receives data 710, which specifies avatar's actions/mood in the virtual world and decodes data 710 by using the VW interface 720*a*. Using the previously described parsing process, the paralinguistic translation server 705 converts the decoded data from the VW client into the intermediate paralinguistic format 715. For example, avatars actions/mood/emotions may be converted to the following exemplarily complex emotion:

```
<complex-emotion>
    <emotion category="happy" modality="face" arousal="0.9"
    power="0.6/>
     <emotion category="elation" modality="face" arousal="0.5"
     power="0.5/>
    <emotion category=" excitement " modality="figure" power="0.2/>
</complex-emotion>
```

Subsequently, the paralinguistic translation server 705 translates the complex emotion of the virtual world to a synonymous complex emotion that would be appropriate for the instant messaging, while also taking into the account the visual capabilities of the IM client. For example, because the visual capabilities of the IM client are limited when compared to the visual capabilities of the VW client, some complex emotions in the virtual world, especially the ones involving gesticulations or movements may not translate directly into the limited set of emoticons available to the IM client. In such a case, the paralinguistic translation server may convert the complex emotion from the virtual world to either a less complex emotion or a simple emotion. Additionally or alternatively, the paralinguistic translation server 705 may add textual descriptions to the instant message to describe or supplement the translated paralinguistic indicators. For example, the paralinguistic translation server may add "avatar waving hand+jumping around the purple fountain" text to the instant message to describe avatar's actions in the virtual world. The resulting translation of the virtual world's paralinguistic indicator may look as following:

<emotion category="happy"> avatar waving hands+ jumping around </emotion>

Finally, the translated emotion expressed in the intermediate paralinguistic format 730 is sent to the IM interface 720*c*, which encodes it back into the IM format. For instance, the IM interface 720*c* encodes the above emotion as "^5"(high five) and ":-))" (very happy face) and inserts these text triggers into the instant message 735. Alternatively or additionally, the IM interface 720*c* may supplement the instant message 735 with textual descriptions of the actions taking place in the virtual world. For example, the textual description "randomuser is very happy, jumping around the purple fountain and waving hands" is inserted in the text of the instant message 735. The resulting data specifying the translated paralinguistic indicators in the IM format 735 is then transmitted to the IM server or the IM client. Consequently, the IM client displays the text of the transmitted instant message, along with the translated emoticons, on the IM user's desktop.

FIG. 8 illustrates an exemplary XML schema that may be used to represent mood information as paralinguistic indicators are translated between IM and VWs. The schema 800 supports a number of different emotions, which are grouped by emotional categories 805*a*-805*g*, such as "negative and forceful", "positive and lively," or "caring."

The schema 800 is capable of describing a variety of emotional states by using emotional tags of varying complexity. A simpler emotional tag utilizes various attributes to specify a category, dimensions (e.g., intensity) and/or appraisals of a single emotional state. Emotional tags may enclose text, links to other XML nodes, or specify a time span using start and end times to define their scope.

The paralinguistic translation server also may translate paralinguistic indicators by evaluating not only one indicator at a time, but also using an overall paralinguistic state of a user. That is, some users do not (or may not) abruptly transition between moods. For example, if a user is unhappy, the user may remain in an unhappy state of mind for some time. As a result, even if the user includes a "happy" emoticon in the instant message after thirty minutes of angry communications, it is possible that the happy emotion is highly transient or is not fully established. Thus, the paralinguistic translation server may track the user's paralinguistic state and utilize that state during the current or future translations of paralinguistic indicators. The paralinguistic state may be based on the context of current/previous textual communications as well as the previous values of the paralinguistic indicators collected over some time period. The XML-based values of emotional parameters discussed with respect to FIGS. 7 and 8 may be used during calculations of the user's paralinguistic state. In one example, the paralinguistic translation server may keep a running average of paralinguistic values (e.g., category, modality, probability, intensity, etc.) to ensure that the user's translated emotions do not transition abruptly. Additionally or alternatively, the paralinguistic translation server may return the user's paralinguistic indicators back to the original state or an adjusted state if the paralinguistic translation server determines that user's emotional change was merely transient. Maintaining persistency in the user's paralinguistic state may allow the paralinguistic translation server to convey more realistic behavior on behalf of the IM user. A short example to illustrate the above concept follows.

An IM user is represented by an avatar in the virtual world. The paralinguistic translation server tracks the IM user's paralinguistic state. For example, based on the previous communications, the paralinguistic server determines that the IM user has been in an "angry" state for over 5 minutes. As a result, the IM user's avatar has been continuously placed in an "angry" state as well. Then, the IM user sends an instant message which includes a "smiley" emoticon. The paralinguistic translation server may detect that the "smiley" emoticon conflicts with the IM user's currently "angry" paralinguistic state. As a result, the paralinguistic translation server may translate the paralinguistic indicator (i.e., "smiley" emoticon) to a partially synonymous paralinguistic indicator in the virtual world (e.g., cause avatar to smile), but then return the IM user's avatar to the previous "angry" state. Additionally or alternatively, the paralinguistic translation server may adjust the IM user's state to "less angry." Thus, IM user's avatar would return to an angry or somewhat less angry state after smiling, but would not immediately transition to the "smiling" state.

In one implementation, translating a mood or expression may be performed using a hierarchy of moods to address inconsistencies between capabilities in the IM and VW systems. For example, a user in a VW system may be furious, which does not appear as a registered mood in the IM system. The paralinguistic translation server may recognize that "furious" is a subset of "angry", which the IM system does recognize. As a result, the paralinguistic translation server may translate the "furious" to "angry" in response to determining that the IM system does not recognize the value "furious" and that "furious" is a subset of "angry."

In addition to allowing an IM user to communicate with users of a virtual world client, as described above, a user may further interact with the virtual world environment using only a text-based communications client, such as, for example, an IM or email client. In this way, such a user, referred to as an IM user, may navigate the virtual world to cause an avatar that represents the IM user within the virtual world to move from one virtual world location to another. To do so, the IM user may execute commands, by typing them into an IM client window, that cause the avatar to move within the virtual world. The following shows some exemplary commands and associated actions.

| Command | Associated Action |
| --- | --- |
| <walk forwards, backwards, left, or right> | moves the avatar forwards, backwards, left, or right from the avatar's current location |
| <fly to location X> | causes the avatar to fly to a particular location identified in the command in place of the letter "X" |
| <teleport to location X> | causes the avatar to teleport to a particular location identified in the command in place of the letter "X" |
| <move proximate to/away from user Y> | moves the avatar next to, or away from, a particular other user identified by name in the command in place of the letter "Y" |

As the IM user navigates the virtual world, the avatar's current location may be monitored in order to provide the IM user with a textual description of the environment of a sub-portion of the virtual world corresponding to the avatar's current location in the virtual world. Such monitoring may be automatically performed when the avatar enters a new location, and/or an IM user may request such monitoring by executing a <look around> command.

The description of the environment may include a description of the physical environment (e.g., green grass, a blue house, a clothing store, and a red car), a description (or listing) of other users that are proximate to the avatar (e.g., users A, B, and C are nearby), and a description of activities taking place in the avatar's current location (e.g., user A is talking to user B, user C is walking her dog, a juggler is performing on the corner, and three users are playing a game of catch in the square).

In one configuration, proximity is identified as including all avatars (e.g., personas) that reside on a particular territory (e.g., square grid) in the virtual world. The particular territory may be associated with a particular system, data structure, or processing operation, and identifying the proximate avatars may include retrieving the list of avatars being managed by the particular system, data structure, or processing operation. The list of proximate avatars then may be transmitted to an instant messaging server for use in one or more instant messaging participant lists. For example, an instant messaging application may include a special folder that identifies proximate virtual world users. The special folder may be dynamic so that it only appears when other avatars are proximate to a particular instant messaging user's avatar.

Alternatively or in addition, proximity may be identified by determining the virtual distance between two avatars. That is, the difference between X, Y, and Z coordinates between a first user's avatar and a second user's avatar may be used to calculate the distance between two avatars. Proximate avatars may be identified as those avatars that reside within a threshold degree of distance. In yet another configuration, proximate users may be identifies as those users with similar interests that lie within the threshold degree of proximity.

In some instances, the IM user may not receive all possible environmental descriptions, proximate user descriptions, or activity descriptions that are determined to exist within the avatar's current location. For example, the IM user may be enabled to provide preference information related to the descriptions that are provided to the user. The user may provide preference information related to (1) a volume of descriptions to be provided to the user (e.g., provide up to 5 environmental descriptions for a particular location, provide up to 25 names of users who are proximate to the avatar, or provide a list of 10 activity descriptions per 15 minutes), (2) a type of descriptions to be provided to the user (e.g., only provide activity descriptions), and/or (3) a list of other users about whom descriptions are to be provided to the user (e.g., provide proximate user descriptions for users A, B, and C, or provide activity descriptions for users D and E).

In another example, the number of descriptions provided to an IM user may be limited based on a default, or user-defined, threshold number of descriptions. The threshold number of descriptions may be a total threshold (e.g., a total number of environmental, proximate user, and activity descriptions that may be provided to a user), or a different threshold number of descriptions may be determined on a per-description category basis (e.g., an environmental description threshold of 25 descriptions, and an activity description threshold of 15 descriptions).

In the case where the number of descriptions determined based on monitoring the avatar's current location substantially exceeds a particular threshold number of descriptions, an interestingness rating for each of the determined descriptions may be determined, and a sub-set of all current descriptions may be provided to the user based on the interestingness ratings. The interestingness rating may be, for example, based on an IM user's preferences (e.g., a user prefers activity descriptions to environmental descriptions), on a generic interestingness rating (e.g., activities involving two users are more interesting than those involving a single user), or on an interestingness rating provided by other users (e.g., a user who is juggling may assign a high interest rating to the juggling activity being performed by that user). Furthermore, particular objects, users, and activities may have default interestingness ratings. For example, on a scale of 1 to 100, with 100 representing a high interestingness rating, a tennis ball may have an interestingness rating of 15, while a two users kissing may have an interestingness rating of 75.

In some implementations, an interestingness rating may be used to determine which descriptions to provide to a user regardless of whether a threshold number of descriptions is exceeded. For example, an IM user may indicate that only descriptions associated with the top 10 interestingness rated objects, users, or activities should be provided for any particular location. In another example, the IM user may indicate that only descriptions associated with objects, users, or activities that exceed a particular interestingness rating threshold (e.g., above an interestingness rating of 65) should be provided to the IM user. Additionally, or alternatively, a system default may be set to determine how many, and how often, descriptions of different interestingness ratings should be provided to an IM user.

If an IM user wishes to receive more information about a particular description, the IM user may execute a <more detail about "description"> command. The IM user may identify the description about which the IM user wishes more information by identifying the description in the "description" portion of the command. A description may be identified using, for example, a description ID, which may be provided with the description, the entire description, or a keyword from the description. Additionally, or alternatively, the IM user may execute a <look closer at Z> command, where the user provides a name of another user, or a name of an object or a portion of a location, in the place of the "Z," where the IM user has previously received a description related to Z. For example, an IM user may receive a description that reads "randomuser is singing." To receive more information about this description, such as the name of the song that randomuser is singing or where randomuser is located, the IM user may execute the command <more detail about "singing"> or the command <look closer at "randomuser">. In response to the <more detail . . . > or <look closer . . . > command, the user may be provided with a description that indicates "randomuser is singing the song "Love Me Do" by the Beatles" or a description that indicates "randomuser is singing from the far street corner."

As described above with respect to FIG. 2, the IM system 200 presents a user with an IM user interface 205 that includes text box 210 that displays representations 215 of the user's contacts in a co-user list. An IM user may manually add or remove contacts from the co-user list. However, the co-user list also may be automatically configured based on navigation of the virtual world by the IM user and interaction with other users within the virtual world.

The co-user list 205 may be modified to include dynamic folders that are generated when other avatars engage in activities of interest. For example, if a crowd of avatars is attending a virtual sporting event, the different, dynamic smart folders may be established within the co-user list (e.g., an instant messaging participant list such as AOL's BuddyList™). A first smart folder may identify the sporting participants, a second smart folder may identify other spectators, and a third folder may identify vendors selling sporting merchandise (e.g., virtual or real clothing). For example, a number of virtual avatars may attend a virtual soccer match at a historic stadium (e.g., Manchester United's Old Trafford). An avatar may visit the virtual stadium to watch a virtual replay of a historic match. As the user is watching the virtual replay, a user may interact with online merchants that appear in the user's instant messaging participant list to purchase Manchester United accessories. For example, the instant messaging participant list may include a list of merchants identified and sorted by category of products (e.g., hats, jerseys, scarves). The user may select one of the vendor's instant messaging labels (e.g., jerseys or away kits) to purchase an actual or virtual item. In one configuration, purchasing an item causes the actual item to be shipped to the user's physical mailing address. In addition, purchase of an item may cause the user's avatar to "wear" a virtual representation of the purchased item. The virtual world application and the instant messaging application may selectively invoke different commerce systems. For example, if a casual virtual world user does not wish to enroll in a virtual world electronic commerce system, instead relying on a non-virtual world electronic commerce system (e.g., an instant messaging-based transaction system), a proxy transaction system may be accessed to permit the user to execute transactions in the virtual world using the non-virtual world transaction system. Thus, a proxy may be configured to receive credit from an instant messaging system, convert the credit to a format used by the virtual world-based electronic commerce system, and use the newly-converted virtual world credit to purchase goods and/or services in the virtual world.

In another example, a first user (e.g., an IM user) may navigate the virtual world using an IM client application as described above. An avatar that represents a second user (e.g., a user that is interacting with the virtual world using a virtual world client, a text-based client, or some other means) is detected as being located proximate to the first user. The IM client may determine if the second user is already included in a co-user list associated with the first user. If so, the IM client may enable the first user to begin a communications session with the second user. If not, the IM client may determine whether to add the second user to the co-user list associated with the first user.

To determine whether to add a particular user to a co-user list, one or more attributes associated with the particular user may be determined. There are two types of attributes: positive attributes and negative attributes. Users associated with positive attributes may be added automatically added to a co-user list associated with a first user when the first user and the positively attributed user are located proximate to one another. Users associated with negative attributes may not be added to such a co-user list, or, if the user is already included in the co-user list, may be removed, and blocked, from the co-user list. In some implementations, for a particular user that is already included in a co-user list, a communications session may be automatically initiated with the particular user only if the particular user is associated with a positive attribute.

Attributes may include activity that a user has engaged in previously, or is currently engaging in, as well as interactions between a user and other users. Examples of positive activity attributes include performing community service such as picking up litter, helping other users find a location or an object, and engaging in any non-negative activity. Examples of positive interaction attributes include hugging another avatar, smiling at another avatar, and shaking hands with another avatar.

Examples of negative activity attributes include engaging in destruction of property, littering, or shouting obscene or offensive language in a large group. Examples of negative interaction attributes include attempting, or engaging in, violent behavior towards another user, harassing another user, speaking to another user in an obscene, or offensive manner, or, in some situations, engaging in adult conduct in a public space.

Activities and interactions may be categorized as positive or negative attributes based on predetermined criteria set by, for example, a system administrator, or based on user preference information specific to an IM user.

In one configuration, users without a prior relationship may be "introduced" via instant messaging based on virtual world-based activities or content. For example, users whose VW profile indicates interest in the same sport or sporting franchise may be added to each other's instant messaging participant list (or added to each other's instant messaging participant list in response to determining that the two users are virtually proximate to one another in the virtual world). A dynamic folder may be created that includes description of common interests for constituent users that appear subordinate to the dynamic folder.

In one configuration, the "introduction" of a first user to a second user is transient in that the first user cannot reestablish contact with the second user once the triggering criteria for the introduction have passed. Thus, if first and second users both express an interest in baseball as a result of attending a virtual baseball game, detecting conclusion of the baseball game may cause the baseball tab in the instant messaging participant list to be eliminated. If the instant messaging label is ephemeral (e.g., using temporary, anonymous screen names), generated for a second user in response to identifying a common interest and no longer existing when that common interest expires, the first user may be unable to establish communications with the second user, absent exchange of identification information during the period of common interests. In another configuration, the first user may be permitted to interact with an instant messaging label and, for example, add the instant messaging label for the second user to the first user's instant messaging participant list.

In one configuration, an instant messaging label (e.g., an identifier such as a screen name) is created in a first user's instant messaging participant list for a second user. The second user need not have an account in the first user's instant messaging system. Rather, the first user's instant messaging system may generate a new, proxy screen name for the second user and use the new, proxy screen name for the first user. The new, proxy screen name may be unrelated to an identifier used in the virtual world, or the identifier may be identical.

In another configuration, an instant messaging label is not generated unless the instant messaging application determines that the second user has an account in the first user's instant messaging system. As a result, the instant messaging system may identify the second user to the first user using a screen name for an existing account for the second user. Alternatively, the second user may elect to use an identifier different than the screen name used in the existing account.

In one configuration, the instant messaging label is descriptive of a virtual world user's activities. For example, a virtual world proxy may determine that a user is playing virtual soccer, and generate an instant messaging label "playingsoccer2007 as a screen name for the user playing virtual soccer. Alternatively or in addition, the screen name may be associated with a soccer ball icon to indicate that the user is playing soccer or configure the soccer player's screen name in the instant messaging participant list to reflect the soccer player's team colors. The modification of the instant messaging label may be based on an inspection of the avatar (persona), the avatar's activities (e.g., playing soccer), the avatar's possessions (e.g., a soccer ball), and/or the avatar's profile (determining that soccer-related terms appear in the user's biography and/or profile a threshold number of times or more than any other categories of vocabulary).

Users may be identified as having common interests, and thus, introduced by determining that the users frequent a similar environment. For example, users attending virtual baseball games (even at different venues) may be introduced based on identifying a common interest in baseball.

It will be understood that various modifications may be made. For example, the operations may be performed in a different order and/or the components in the disclosed systems may be combined in a different manner and/or replaced or supplemented by other components. As an example, the paralinguistic translation server may be located on the IM server, VW server, or client computers.

What is claimed is:

1. A computer-implemented method of translating activities performed by at least one processor, comprising:

receiving, by a processing device, a request to authenticate a client device of a user;

receiving, by the processing device, a set of data from a first communication system comprising a virtual reality environment, the set of data including one or more first paralinguistic indicators associated with the user;

parsing, by the processing device, the one or more first paralinguistic indicators including an intensity of an emotion or sentiment of the user on an intensity spectrum for each of the one or more first paralinguistic indicators;

determining whether one of the first communication system and a second communication system comprising a textual environment use communication protocols or formats that are incompatible with each other;

based on a determination that the first communication system and the second communication system use communication protocols or formats that are incompatible with each other, converting, by the processing device, the first paralinguistic indicators into one or more XML-based intermediate paralinguistic indicators based on the intensity of the emotion or sentiment of the user on the intensity spectrum for each of the one or more first paralinguistic indicators; and converting the one or more XML-based intermediate paralinguistic indicators into one or more second paralinguistic indicators.

2. The computer-implemented method of claim 1, further comprising generating a text message based on the one or more XML-based intermediate paralinguistic indicators.

3. The computer-implemented method of claim 2, wherein the text message comprises an instant message.

4. The computer-implemented method of claim 2, wherein the text message comprises an emoticon.

5. The computer-implemented method of claim 1, wherein the intensity spectrum specifies expressions through speech, facial expressions, or specific body gestures.

6. The computer-implemented method of claim 1, wherein the intensity is specified numerically.

7. The computer-implemented method of claim 1, wherein the intermediate paralinguistic indicators comprise one or more complex-emotion tags comprising multiple sub-emotion tags; and wherein the complex-emotion tags specify intensity numerically by adjusting numerical values of parameters corresponding to the complex-emotion tags.

8. A system for translating activities performed by at least one processor, comprising:

a storage medium storing a set of instructions; and a processor configured to execute the set of instructions to perform operations including:

receiving, by a processing device, a request to authenticate a client device of a user;

receiving, by the processing device, a set of data from a first communication system comprising a virtual reality environment, the set of data including one or more first paralinguistic indicators associated with the user;

parsing, by the processing device, the one or more first paralinguistic indicators including an intensity of an emotion or sentiment of the user on an intensity spectrum for each of the one or more first paralinguistic indicators;

determining whether one of the first communication system and a second communication system comprising a textual environment use communication protocols or formats that are incompatible with each other;

based on a determination that the first communication system and the second communication system use communication protocols or formats that are incompatible with each other, converting, by the processing device, the first paralinguistic indicators into one or more XML-based intermediate paralinguistic indicators based on the intensity of the emotion or sentiment of the user on the intensity spectrum for each of the one or more first paralinguistic indicators; and converting the one or more XML-based intermediate paralinguistic indicators into one or more second paralinguistic indicators.

9. The system of claim 8, wherein the operations performed by the processor further comprise:

generating a text message based on the intermediate paralinguistic indicators.

10. The system of claim 9, wherein the text message comprises an instant message.

11. The system of claim 9, wherein the text message comprises an emoticon.

12. The system of claim 8, wherein the intensity spectrum specifies expressions through speech, facial expressions, or specific body gestures.

13. The system of claim 8, wherein the intensity is specified numerically.

14. The system of claim 8, wherein the intermediate paralinguistic indicators comprise one or more complex-emotion tags comprising multiple sub-emotion tags; and wherein the complex-emotion tags specify intensity numerically by adjusting numerical values of parameters corresponding to the complex-emotion tags.

15. A non-transitory computer-readable medium storing a set of instructions that, when executed by at least one processor, perform a method of translating activities, the method comprising:

receiving, by a processing device, a request to authenticate a client device of a user;

receiving, by the processing device, a set of data from a first communication system comprising a virtual reality environment, the set of data including one or more first paralinguistic indicators associated with the user;

parsing, by the processing device, the one or more first paralinguistic indicators including an intensity of an emotion or sentiment of the user on an intensity spectrum for each of the one or more first paralinguistic indicators;

determining whether one of the first communication system and a second communication system comprising a textual environment use communication protocols or formats that are incompatible with each other;

based on a determination that the first communication system and the second communication system use communication protocols or formats that are incompatible with each other, converting, by the processing device, the first paralinguistic indicators into one or more XML-based intermediate paralinguistic indicators based on the intensity of the emotion or sentiment of the user on the intensity spectrum for each of the one or more first paralinguistic indicators; and converting the one or more XML-based intermediate paralinguistic indicators into one or more second paralinguistic indicators.

16. The computer-readable medium of claim 15, wherein the set of instructions further cause the processor to perform the following operation:

generating a text message based on the one or more XML-based intermediate paralinguistic indicators.

17. The computer-readable medium of claim 16, wherein the text message comprises an instant message.

18. The computer-readable medium of claim 15, wherein the intensity spectrum specifies expressions through speech, facial expressions, or specific body gestures.

19. The computer-readable medium of claim 15, wherein the intensity is specified numerically.

20. The computer-readable medium of claim 15, wherein the intermediate paralinguistic indicators comprise one or more complex-emotion tags comprising multiple sub-emotion tags; and wherein the complex-emotion tags specify intensity numerically by adjusting numerical values of parameters corresponding to the complex-emotion tags.

* * * * *